Jan. 8, 1957 C. F. CARLSON 2,776,712

PUNCHING DEVICE HAVING WORK POSITIONING LOCATING PINS

Filed Feb. 28, 1955 3 Sheets-Sheet 1

INVENTOR.
CHESLEY F. CARLSON
BY H. F. Woodward
atty.

INVENTOR.
CHESLEY F. CARLSON
BY H. F. Woodward
atty

Jan. 8, 1957 C. F. CARLSON 2,776,712

PUNCHING DEVICE HAVING WORK POSITIONING LOCATING PINS

Filed Feb. 28, 1955 3 Sheets-Sheet 3

INVENTOR.
CHESLEY F. CARLSON

BY H. F. Woodward
atty

United States Patent Office 2,776,712
Patented Jan. 8, 1957

2,776,712

PUNCHING DEVICE HAVING WORK POSITIONING LOCATING PINS

Chesley F. Carlson, Minneapolis, Minn.

Application February 28, 1955, Serial No. 491,030

10 Claims. (Cl. 164—86)

This invention relates to means for and method of preparing printing plates having multiple images in an exact relationship to each other.

The object of this invention is to provide means for preparing printing plates in a more economical and more accurate method than has heretofore been possible.

In making printing plates, multiple negatives or positives, the sensitized surface is photographically repeated by the use of a negative or positive contained in the subject, the negative or positive being photographically derived from the original drawing.

In the field of printing, there is a need for what is termed stepping over and up of an image on a sensitized plate or negative-type material to provide multiple images each in the exact relationship to the other images. In this field it is also necessary to prepare more than one plate, negative or positive, with multiple images on each, with each representing a color of a multiple color printing job. In such an instance, the relationship of the images to each other must have each image in exact register with all other images not only for one color but for all colors in the multiple color operation. To obtain such stepping over and up the key negative is registered to the outline of the printed piece as drawn on masking material, sometimes called "goldenrod." This negative must have a predetermined relationship to pattern of holes made in the masking paper. If the image is to be stepped over, that is horizontally only, the requirements in holes involve only two holes at the base of the masking paper or material, these holes must be of the exact width of the printed job inclusive of margin and trim. If the image is to be stepped horizontally and vertically, it not only must have the holes horizontally as above indicated, but also have sets of holes in proper relationship in a vertical manner. There must be as many sets of holes as there are vertical steps.

It is important in stepping vertically and horizontally that holes be in absolute alignment with each other. To accomplish this it has been proposed that the two horizontal holes be made in the masking material for the width of the job plus margin for trim, then square these holes up on a light table with a T square and then lines are drawn vertically from the edge of the holes. These lines indicate the width of the printed piece to be drawn on the masking material. The height of the printed piece and the number of times it is desired to step the image up vertically is determined and then horizontal lines are drawn for the number of times the image is to be repeated. Another horizontal line is then drawn a distance above the last horizontal line to give the size of the individual printed piece. In this outlined area the negative is placed in proper position and affixed to the masking material. Next there is provided as many strips of "goldenrod" or masking material with the same width holes as previously established and these are then affixed to the masking material to establish a relationship with the negative that will give vertical duplication of images on the printing plate as desired. This procedure is slow and cumbersome.

By the present means and method all holes are made directly in the original masking material. When this is done an absolute relationship must be maintained between the holes. An apparatus that will provide this result includes a punch that travels from left to right on a bar provided with a suitable scale; a fixed pin in alignment with the traveling punch; a second pin is provided on a bar that is in right angles to the bar upon which the punch moves, this second locating pin is movably mounted on the bar. It is important that the second locating pin be so placed and remain in relationship to the first locating pin and the movable punch as to form an exact 90° angle at any and all points on both bars.

Other and further objects of the invention and the advantages of the same will be pointed out hereinafter and indicated in the appended claims, or will be obvious to one skilled in the art upon understanding the present disclosure.

For the purpose of this application there has been set forth two structures and one particular method of producing the same, but it is to be understood that they are here presented for illustrative purposes only and are not to be accorded any interpretation such as might have the effect of limiting what is claimed as the invention short of its true and comprehensive scope in the art.

The invention consists in the novel combination and arrangement of parts to be hereinafter described and claimed.

The invention will be best understood by reference to accompanying drawings in which.

Figure 1:
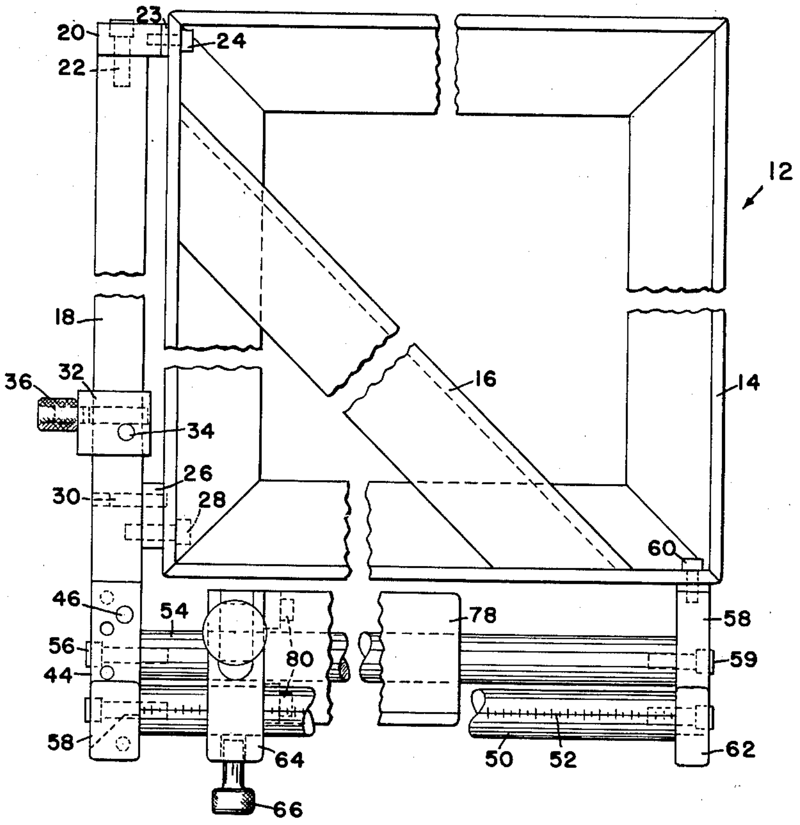
Figure 1 is a plan view with parts broken away showing the apparatus for producing openings in masking material having a definite relationship to each other.
Figure 2:
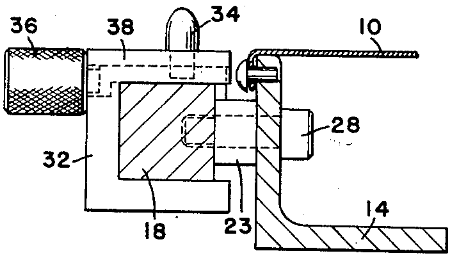
Figure 2 is a sectional view through the locating pin rail and part of the work supporting surface.

The work supporting surface 10 is suitably secured to the frame which is generally indicated at 12. The frame includes side members 14 rigidly secured together. It is generally preferred that the side members be made of angle iron, but it is to be understood that other suitable material may be used. To assist in holding the frame in proper alignment, a brace member 16 may be employed as shown in Figure 1 but it is to be understood that additional braces may be utilized if found desirable. Along one edge of the frame is rigidly secured bar-like member 18. It is preferred that this bar be of rectangular construction. At one end the bar 18 is fastened to member 20 by bolt-like member 22. A pad 23 is positioned between member 20 and the side 14 and a bolt-like member 24 passes through the side 14, the pad 23, and into the member 20. Adjacent the other end of side member 14 is positioned pad 26, and bolt member 28 holds the bar in position. A dowel member 30 is secured in the bar 18, pad 26 and the side member 14. Slidably mounted on the bar 18 is movable member 32 which carries locating pin 34. The member 32 can be locked in the desired position by member 36 passing against the bar 38 and bringing this bar into tight frictional engagement with the bar 18.

Mounted on the bar 18 and secured thereto by bolt-like members 40 and 42 is support member 44. A fixed locating pin 46 is carried by the bar 18 and passes through the member 44. The extension 48 of member 44 supports one end of rod 50 which has suitably inscribed thereon a graduated scale 52.

Rod 54 has one end securely fastened to bar 18 by bolt member 56. The opposite end of the rod 54 is supported by bar 58 to which it is attached by bolt-like member 59. The bar 58 is attached to the side frame 14 by means of bolt 60. The extension 62 of bar 58 supports one end of the rod 50.

Figures 3, 4, 5, 6:
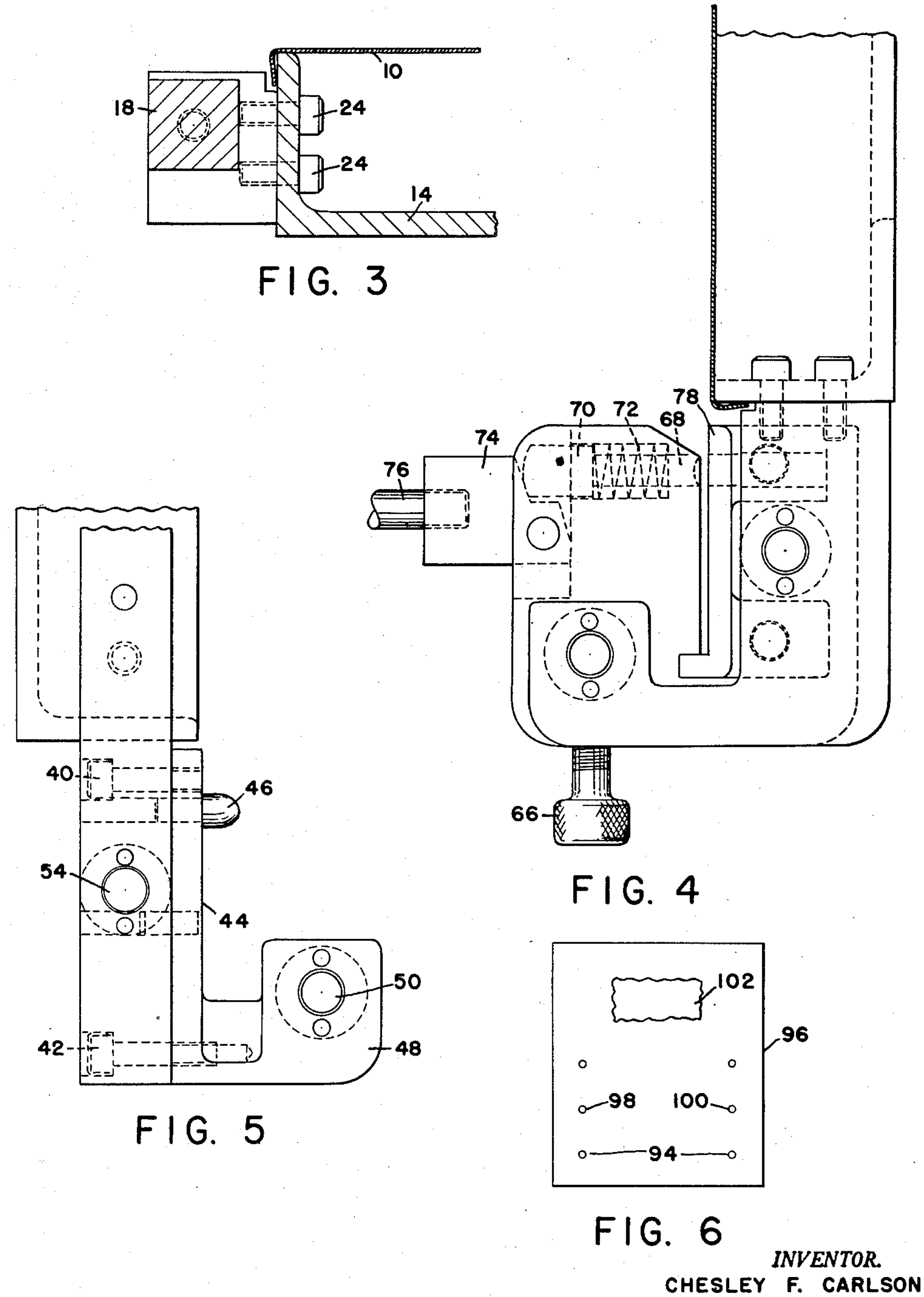
Figure 3 is a sectional view taken through the locating pin rail and part of the work supporting surface adjacent the fixed locating pin.
Figure 4 is a side elevational view showing the movable punch with the work supporting surface in section with parts broken away.
Figure 5 is a side elevational view of Figure 1 looking from the left with portions broken away.
Figure 6 is a plan view of masking material having the holes formed therein.

Mounted for movement on rod 54 is punch carrying frame 64. The frame is shaped as shown in Figure 4 and moves upon rods 50 and 54. After the position of the punch has been reached, it can be secured in place by means of screw 66 being tightened against rod 50. The hole producing means includes a paper cutting member 68 in alignment with the fixed locating pin 46. The member 68 is carried by punch head 70 which is urged upwardly by spring member 72. Pivotally mounted on frame 64 is member 74 from which extends handle 76. Rigidly attached to frame 64 is gauge plate 78 by means of screw 80. This is employed in punching holes in master strips.

The rod 50 is provided with openings 82 into which spring pressed pin 84 is adapted to engage, the pin 84 being mounted on and carried by the frame 90 referred to below. The punch is moved to about the location for forming an opening and then the micrometer 86, which is attached to the frame 64 at 88, is used to obtain the final adjustment of the punch. After the adjustment by the micrometer, the frame 64 is secured in place by screw 66. The micrometer is mounted in frame 90 which frame is adapted to travel along rods 50 and 54. The micrometer is positioned at a predetermined distance from the punch, for example, two inches. The openings 82 are spaced, for example, one inch apart.

Figure 7:
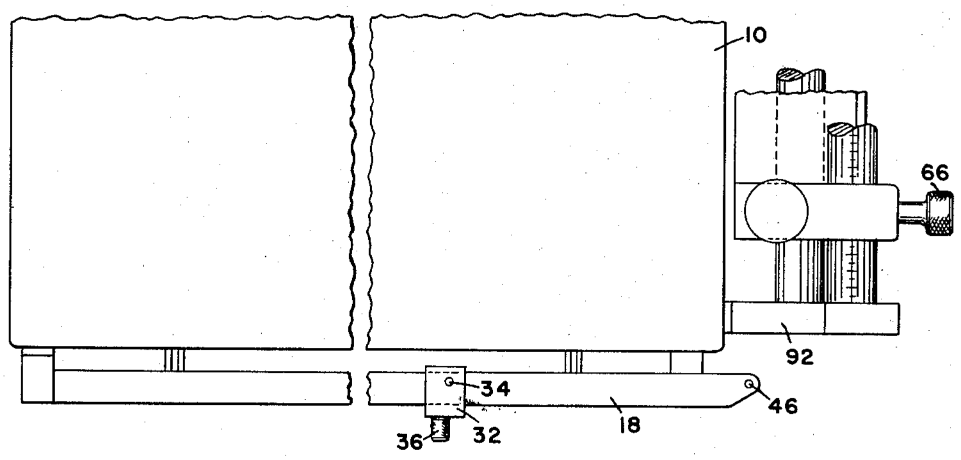
Figure 7 is a view of the work supporting surface with a modified arrangement of the bars secured along the two edges thereof.
Figure 8:
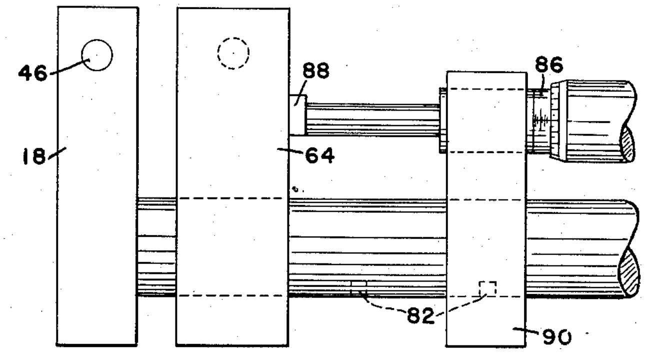
Figure 8 is a view of the punch showing the micrometer attached thereto with portions broken away; and, Figure 9 is a side view of the micrometer supporting means.
Figure 9:
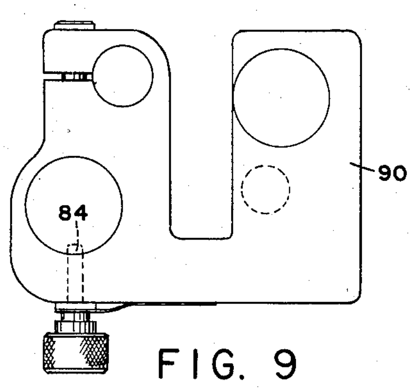

In Figure 7 is shown an arrangement of the bar 18 and rods 50 and 54 which is preferred. The fixed locating pin 46 is positioned adjacent an end of the bar 18. The bar is suitably secured to the frame supporting the work surface 10 at a plurality of places. Rods 50 and 54 are supported by bracket member 92 which is attached to the side of the frame rather than being supported by the bar 18.

The initial holes 94 are punched in the masking material carrying negative 102. The masking material is turned clockwise one quarter turn so that the two holes are in a vertical position. The bottom hole is engaged on the fixed locating pin 46 and the top hole is engaged on the sliding locating pin 34. The sliding locating pin is moved away from the fixed locating pin until the masking material 96 is drawn smoothly between the two pins and then the sliding pin is secured in place. The traveling punch is now set at the distance in which the job is to be stepped vertically. The masking material is engaged by the two locating pins and is lightly drawn under the punch and a hole is punched in the masking paper. The masking material is now turned over so that the two holes initially engaged by the locating pins are reversed and again engaged by the locating pins. The masking material is smoothed under the punch and the fourth hole is formed into the masking material. The paper is now moved down to engage the third hole 98 and fourth hole 100 on the locating pins and the operation repeated. By this operation there is punched into the masking material two series of holes, each of which in a horizontal sense are exactly the width of the printed individual piece plus margin for trim and, each of which in its relationship to the holes in its series is exactly the height of the printed individual piece plus margin for trim. The sets of holes are equidistant above, formed on parallel lines above the base set of holes.

To properly align each series of holes in each masking material to their respective printing plate, there is employed a master strip in which holes are punched to the exact width as the printed individual piece plus margin for trim. In the master strip there is formed one more hole than there are horizontal steps. The holes are in parallel alignment with the top of the strip.

What is claimed:

1. A device of the class described comprising a work supporting surface, a locating pin bar secured to and extending along one side of said work supporting surface, a locating pin extending upwardly above the plane of the work supporting surface slidably mounted on said locating pin bar, a fixed locating pin extending upwardly above the plane of the work supporting surface secured to said locating pin bar adjacent one end of said bar, a punch bar attached to one edge of the work supporting surface and at a right angle to the locating pin bar, a spacer bar supported above the punch bar, a punch housing movably mounted on said punch bar and the said spacer bar, and a punch in said punch housing normally positioned above the plane of the work supporting surface, said punch being in alignment with said fixed locating pin so that a line extending from the said punch to the fixed locating pin is at right angles to a line extending from the fixed locating pin to the movable locating pin.

2. A device of the class described comprising a work supporting surface, a locating pin bar secured to and extending along one edge of the work supporting surface, a punch bar supported along one side of the work supporting surface and at a right angle to the said locating pin bar, a punch movably mounted on said punch bar, said punch normally positioned above the plane of the work supporting surface, a movable locating pin mounted on said locating pin bar, and a fixed locating pin secured to said locating pin bar, said locating pins extending upwardly above the plane of the work supporting surface, said fixed locating pin being in alignment with the punch bar, whereby a line extending from said punch to the fixed locating pin is at right angles to a line extending from the fixed locating pin to the movable locating pin.

3. A device of the class described comprising a substantially rectangular frame, a work supporting surface rigidly attached to said frame, a pin bar attached to said frame and extending along one side of the work supporting surface, a slidably mounted locating pin on said pin bar, a fixed locating pin adjacent one end of said pin bar, said locating pins extending upwardly above the plane of the work supporting surface, a punch bar attached to said frame and at a right angle to said pin bar, a spacer bar supported by the frame and substantially parallel to the punch bar, and a punch movably mounted on said punch bar said punch normally positioned above the plane of the work supporting surface and in alignment with the said fixed locating pin, so that a line extending from the punch to the fixed locating pin is at right angles to the line extending from the fixed locating pin to the movable locating pin.

4. A device of the class described comprising a substantially rectangular frame, a work supporting surface attached to said frame, a substantially rectangular pin bar attached to said frame and extending along one side of the work supporting surface, a slidably mounted locating pin on said bar, a fixed locating pin on said bar adjacent one end, said pins extending upwardly above the plane of the work supporting surface, a punch bar attached to said frame and at a right angle to said pin bar, a spacer bar supported by said frame and in substantially parallel relationship to said punch bar, a punch housing mounted on said punch bar and said spacer bar, a punch mounted in said housing, said punch normally supported in a plane above the work supporting surface and in alignment with said fixed locating pin so that a line extending from said punch to said fixed locating pin is at right angles to a line extending from the fixed locating pin to the movable locating pin and means for locking the punch housing to said spacer bar.

5. A device of the class described comprising a substantially rectangular frame, a work supporting surface attached to said frame, a substantially rectangular pin bar attached to said frame and extending along one side of the work supporting surface, a slidably mounted locating pin on said bar, a fixed locating pin on said bar adjacent one end, said pins extending upwardly above the plane of the work supporting surface, a punch bar attached to said frame and at a right angle to said pin bar, a spacer bar supported by said frame and in substantially parallel relationship to said punch bar, a punch housing mounted on said punch bar and said spacer bar, a punch mounted in said housing, said punch normally positioned in a plane above the work supporting surface and in alignment with said fixed locating pin so that a line extending from the said punch to the fixed locating pin is at right angles to the line extending from the movable locating pin to the fixed locating pin and a back gauge secured to said punch housing.

6. A device of the class described comprising a substantially rectangular frame, a work supporting surface attached to said frame, a substantially rectangular pin bar attached to said frame and extending along one side of the work supporting surface, a slidably mounted locating pin on said bar, a fixed locating pin on said bar adjacent one end, said locating pins extending upwardly above the plane of the work supporting surface, a punch bar attached to said frame and at a right angle to said pin bar, a spacer bar supported by said frame and in substantially parallel relationship to said punch bar, a punch housing mounted on said punch bar and said spacer bar, a punch mounted in said housing and being in alignment with said fixed locating pin, whereby a line extending from the punch to the fixed locating pin is at right angles to a line extending from the fixed locating pin to the movable locating pin, said punch normally positioned in a plane above the work supporting surface, a micrometer adapter movably mounted on the said punch bar and spacer bar, and a micrometer supported by the micrometer adapter and attached to the punch housing.

7. A device of the class described comprising a substantially rectangular frame, a work supporting surface attached to said frame, a substantially rectangular pin bar attached to said frame and extending along one side of the work supporting surface, a slidably mounted locating pin on said bar, a fixed locating pin on said bar adjacent one end, said locating pins extending upwardly above the plane of the work supporting surface, a punch bar attached to said frame along one edge thereof and at a right angle to said pin bar, a spacer bar supported by said frame and in substantially parallel relationship to said punch bar, a punch housing mounted on said punch bar and said spacer bar, a punch mounted in said housing and in alignment with said fixed locating pin so that a line extending from the fixed locating pin to the punch is at right angles to a line extending from the fixed locating pin to the movable locating pin, a micrometer adapter movably mounted on the said punch bar and spacer bar, and a micrometer supported by the micrometer adapter and attached to the punch housing, and means for locking the micrometer adapter to the spacer bar, said punch normally positioned in a plane above the work supporting surface 8. A device of the class described comprising a substantially rectangular frame, a work supporting surface attached to said frame, a substantially rectangular pin bar attached to said frame and extending along one side of the work supporting surface, a slidably mounted locating pin on said bar, a fixed locating pin on said bar adjacent one end, said locating pins extending upwardly above the plane of the work supporting surface, a punch bar attached to said frame and at a right angle to said pin bar, a spacer bar supported by said frame and in substantially parallel relationship to said punch bar, a punch housing mounted on said punch bar and said spacer bar, a punch mounted in said housing and in alignment with said fixed locating pin whereby a line extending from a punch to the first locating pin is at right angles to a line extending from the movable locating pin to the first locating pin and means for locking the punch housing to said spacer bar and a back gauge secured to said punch housing, said punch normally positioned in a plane above the work supporting surface.

9. A device of the class described comprising a substantially rectangular frame, a work supporting surface attached to said frame, a substantially rectangular pin bar attached to said frame and extending along one side of the work supporting surface, a slidably mounted locating pin on said bar, a fixed locating pin on said bar adjacent one end, said locating pins extending upwardly above the plane of the work supporting surface, a punch bar attached to said frame and at a right angle to said pin bar, a spacer bar supported by said frame and in substantially parallel relationship to said punch bar, a punch housing mounted on said punch bar and said spacer bar, a punch mounted in said housing and in alignment with said fixed locating pin whereby a line extending from the fixed locating pin is at right angles from the line extending from the fixed locating pin to the movable locating pin, means for locking the punch housing to said spacer bar, and a back gauge secured to said punch housing, a micrometer adapter movably mounted on the said punch bar and spacer bar, a micrometer supported by the micrometer adapter and attached to the punch housing, and means for locking the micrometer adapter to the spacer bar, said punch normally positioned in a plane above the work supporting surface.

10. A device of the class described comprising a substantially rectangular frame, a work supporting surface attached to said frame, a substantially rectangular pin bar attached to said frame and extending along one side of the work supporting surface, a slidably mounted locating pin on said bar, a fixed locating pin on said bar adjacent one end, said locating pins extending above the plane of the work supporting surface, a punch bar attached to said frame and at a right angle to said pin bar, a spacer bar having openings therein supported by said frame and in substantially parallel relationship to said punch bar, a punch housing mounted on said punch bar and spacer bar, a punch mounted in said housing and in alignment with said fixed locating pin whereby a line extending from the punch to the fixed locating pin is at right angles to the line extending from the fixed locating pin to the movable locating pin, means for locking the punch housing to said spacer bar, a back gauge secured to said punch housing, a micrometer adapter movably mounted on said punch bar and spacer bar, a locating pin carried by the micrometer adapter and insertable in an opening in said spacer bar, and a micrometer supported by the micrometer adapter and attached to the punch housing, said punch normally positioned in a plane above the work supporting surface.

References Cited in the file of this patent

UNITED STATES PATENTS

| | | |
|---|---|---|
| 94,857 | Allonas | Sept. 14, 1869 |
| 191,311 | Choate | May 29, 1877 |
| 1,669,344 | Moore | May 8, 1928 |
| 1,755,468 | Cheshire | Apr. 22, 1930 |
| 2,123,170 | Dawson | July 12, 1938 |
| 2,227,575 | Eliel et al. | Jan. 7, 1941 |